United States Patent [19]

Brusasco

[11] 4,074,587
[45] Feb. 21, 1978

[54] SCREW-NUT SCREW TRANSMISSION COUPLING

[75] Inventor: Enzo Brusasco, Turin, Italy

[73] Assignee: Roltra S.p.A., Milan, Italy

[21] Appl. No.: 714,075

[22] Filed: Aug. 12, 1976

[30] Foreign Application Priority Data

July 27, 1976 Italy .................................. 68870/76

[51] Int. Cl.² .......................... F16H 1/18; F16H 1/20; F16H 55/22

[52] U.S. Cl. .................................. 74/424.8 R; 74/459

[58] Field of Search ............ 74/424.5, 424.7, 424.8 R, 74/459

[56] References Cited

U.S. PATENT DOCUMENTS

| | | | |
|---|---|---|---|
| 2,891,414 | 6/1959 | Gillum | 74/459 |
| 3,081,644 | 3/1963 | Hudgens et al. | 74/424.8 R |
| 3,643,522 | 2/1972 | Fullam | 74/459 |
| 3,731,546 | 5/1973 | MacDonald | 74/424.8 R X |
| 3,791,232 | 2/1974 | Helmer | 74/424.8 R |

Primary Examiner—Leonard H. Gerin
Attorney, Agent, or Firm—Ladas, Parry, Von Gehr, Goldsmith & Deschamps

[57] ABSTRACT

A screw-nut screw coupling in which a tubular element provided with an inner helical groove is coupled to an elongate member provided with an outer helical groove by means of a number of balls mounted for rolling along an helical path defined by said helical grooves and forming a portion of an endless path for said balls to roll there along, said tubular element being formed by at least two co-axial tubular sleeves rigidly connected to one another, one of said sleeves being arranged outside the other and being provided with groove means defining a portion of the endless path and communicating with said helical path via at least one hole provided through the inner sleeve.

19 Claims, 10 Drawing Figures

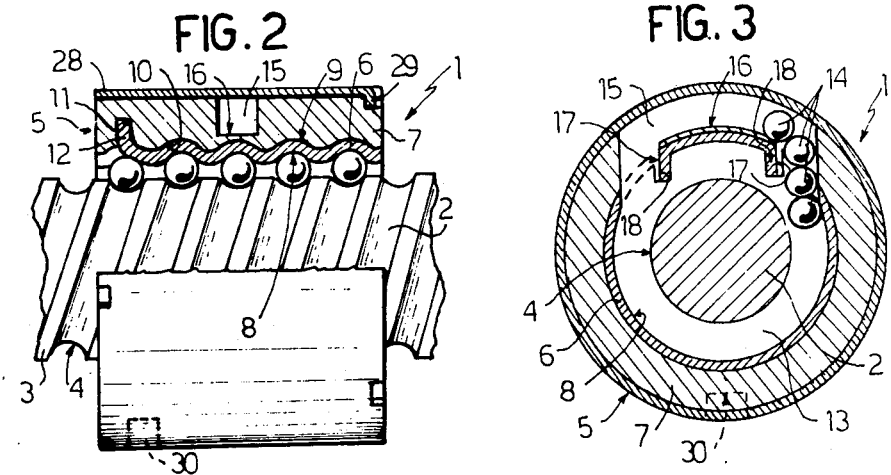
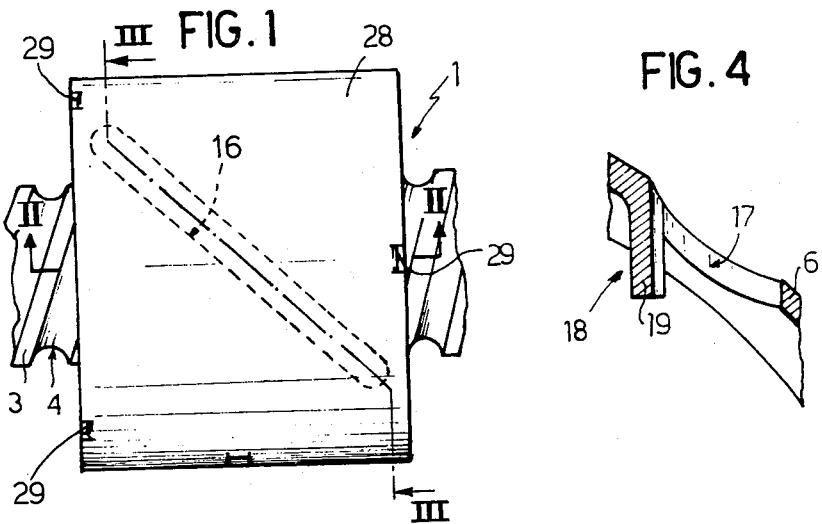
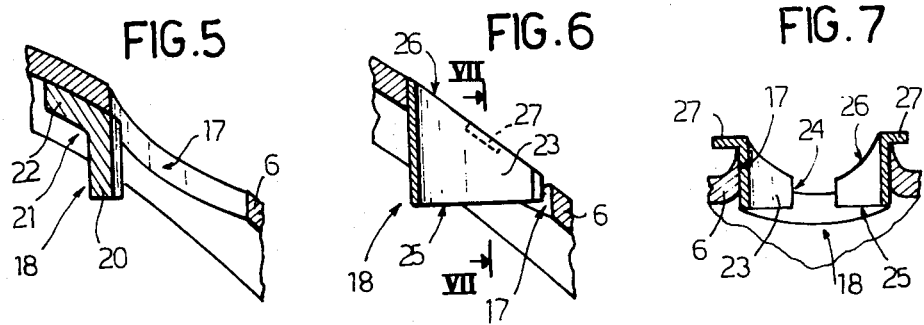

SCREW-NUT SCREW TRANSMISSION COUPLING

BACKGROUND OF THE INVENTION

This invention relates to a screw-nut screw coupling of the type comprising a first and second element coupled together in such a manner that rotary motion of one of them produces corresponding translatory motion of the other.

In particular the present invention relates to a screw-nut screw coupling of the type comprising a tubular element with at least one internal helical groove of constant pitch; an elongated element extending with radial slack through said tubular element and comprising externally at least one helical groove of pitch substantially equal to the pitch of said internal groove and defining with this latter a first rolling path for a plurality of balls interposed between said elongated and tubular elements, and recirculation means defining at least one second rolling path of said balls and extending between two distinct points of said first path and parallel thereto, to define with this latter an endless rolling path for said balls.

In known screw-nut screw couplings of the type heretofore described, the said tubular element generally consists of a single piece normally produced by mechanical chip-forming machining starting from a block of special steel, on which one or more external ducts are added when machining is finished, each duct defining a recirculation path for said balls. Because of the relatively high costs of such a manufacturing process, the use of screw-nut screw couplings of the aforementioned type has been substantially limited to extremely sophisticated applications in which the need to obtain maximum operational precision and minimum friction outweighs any cost consideration.

SUMMARY OF THE INVENTION

The object of the present invention is to provide a screw-nut screw coupling of the aforementioned type, the structure of which allows its construction at relatively low cost, while preserving the precision and low friction characteristics of known couplings of the same type.

This object is attained by the screw-nut screw coupling of the aforementioned type, according to the present invention, wherein said tubular element comprises at least two rigidly connected coaxial tubular sleeves, the first disposed inside the second, said first sleeve internally comprising said internal groove, and said second rolling path extending through said second sleeve and communicating with said first path by way of at least one hole provided through the first sleeve.

Preferably, said first sleeve consists of hardened steel and said second sleeve is formed by direct moulding on said first sleeve.

BRIEF DESCRIPTION OF THE INVENTION

The invention will be described by way of example with reference to the accompanying drawings, wherein:

FIG. 1 is a side view of a first screw-nut screw coupling constructed in accordance with the present invention;

FIG. 2 is a section on the line II—II of FIG. 1;

FIG. 3 is a section on the line III—III of FIG. 1;

FIG. 4 is a section to an enlarged scale through a detail of FIG. 3;

FIG. 5 is a section to an enlarged scale of a first modification of the detail of FIG. 4;

FIG. 6 is a section to an enlarged scale through a second modification of the detail of FIG. 4;

FIG. 7 is a section on the line VII—VII of FIG. 6;

DETAILED DESCRIPTION OF THE INVENTION

Figure 10:
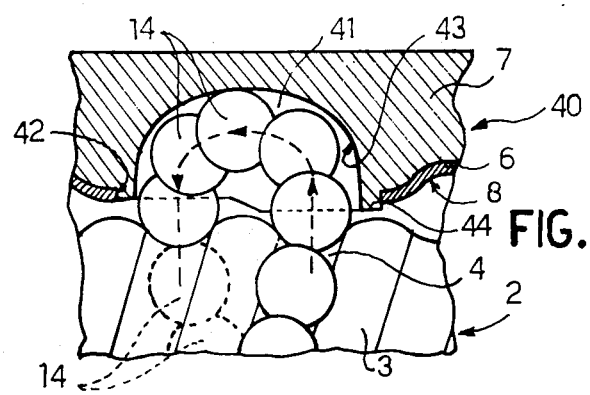
FIG. 10 is an axial section through a portion of a fourth screw-nut screw coupling constructed in accordance with the invention.

FIG. 1 shows a screw-nut screw coupling indicated overall by 1, comprising two mutually coupled members, of which the first, indicated by 2, is an elongated element consisting of a rigid screw with a single-start thread 3 defining a helical groove 4 of substantially semicylindrical section, and the second, indicated by 5, is a tubular element through which the screw 2 extends with radial slack. The tubular element 5 comprises two coaxial sleeves 6 and 7 rigid one with the other, the first disposed inside the second. The sleeve 6 preferably consists of hardened steel plate shaped to define on its inner surface a helical groove 8 of substantially semicylindrical section and of pitch equal to that of the groove 4. A helical protuberance 9 on the outer surface of the sleeve 6 corresponds to the groove 8, and engages with a corresponding helical groove 10 formed on the inner surface of the sleeve 7. This latter preferably consists of reinforced plastics or sintered steel, and at one end comprises a plurality of radial cavities 11 (of which only one is illustrated), each of which houses internally an external radial appendix 12 of the sleeve 6. The appendices 12 are preferably constructed by shearing and bending, and are arranged to lock the sleeves 6 and 7 together both axially and angularly.

The helical grooves 4 and 8 are disposed facing each other and define a helical path 13 (FIG. 3) for a plurality of balls 14 interposed between the elements 2 and 5 and arranged to guarantee that these latter are coaxial and to transform the rotary motion of one of said two elements into translatory motion of the other element and vice versa, with a transmission ratio which is a function of the diameter of the balls 14.

Two distinct spaced-apart points on the helical path 13 are connected together by a substantially U-shaped recirculation path 15 comprising a channel 16 formed on the outer surface of the sleeve 7 and extending (FIG. 1) in a plane forming a determined angle with the axis of the sleeve 7. The channel 16 has a substantially square cross-section, and each of its ends communicates with a hole 17 (FIG. 3) provided through the sleeve 6 to enable the balls 14 to pass from the path 13 to the path 15 and vice versa. This passage of the balls 14 from one path to the other through the holes 17 is guaranteed by a deflector 18 extending from the sleeve 6 inside the path 13.

As shown in detail in FIG. 4, each deflector 18 consists of a bent lug 19 obtained by shearing the sleeve 6 and then milling laterally. In the modification shown in FIG. 5, each deflector 18 consists of a surface-milled arm 20 of an L shaped bracket 21, the other arm of which, indicated by 22, is welded to the inner surface of the sleeve 6. Finally, in the modification shown in FIGS. 6 and 7, each deflector 18 consists of a cylindrical conduit 23 made radially resilient by an axial cut 24 and forcibly mounted into the relative hole 17. Each conduit 23 has a flat inner end surface 25 which is substantially perpendicular to the axis of the hole 17, and a fluted outer end surface 26 substantially coplanar with the outer surface of the sleeve 6. Each conduit 23 also comprises two external abutment appendices 27 disposed at the same level as the surface 26 and in contact with the outer surface of the sleeve 6.

As shown in FIGS. 1 to 3, on the sleeve 7 there is mounted a sleeve 28 provided at each end with a plurality of radial appendices 29 preferably obtained by calking, and each engaged in a respective cavity formed on the outer surface of the sleeve 7. This latter is also preferably provided with a further cavity 30 to enable the tubular element 5 to be radially locked with respect to a non-illustrated support.

The sleeve 28 acts as a closing cover for the channel 16 and is mounted on the sleeve 7 after introducing through the channel 16 a sufficient number of balls 14 to completely fill the paths 13 and 15. In a non-illustrated modification, the sleeve 28 is replaced by a half ring provided at its lateral ends with axial flat portions snap mounted in corresponding axial cavities (not shown) in the outer surface of the sleeve 7, and also usable as seats for keys (not shown) for angularly locking the tubular element 5 to a non-illustrated support.

The sleeve 6 is preferably constructed by rolling, or by moulding as a complete piece or in sectors, or by profiled resilient winding. The sleeve 7 is preferably constructed by direct moulding on the sleeve 6. The channel 16 is preferably constructed during this moulding operation.

Alternately, the sleeve 7 may be constructed separately by moulding. In this case two half-shells are constructed, which are welded together to integrate the sleeve 7 after they have been mounted on the sleeve 6.

Figure 8:
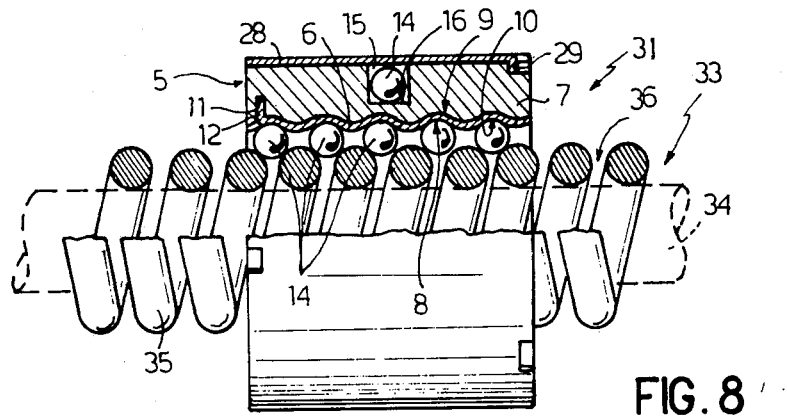
FIG. 8 is a partial axial section through a second screw-nut screw coupling constructed in accordance with the present invention.

The described coupling 1 is able to transform rotary motion of one of the elements 2 and 5 into straight-line translatory motion of the other element. If it should be necessary to transform rotary motion into translatory motion which is not necessarily straight-lined, one of the couplings 31 or 32 shown in FIGS. 8 and 9 may be used. As in the case of the coupling 1, the couplings 31 and 32 also comprise an outer tubular element and an inner elongated element. However, while the outer tubular element of the couplings 31 and 32 is substantially identical to that of the coupling 1, and carries the same reference numerals, the inner elongated element of the couplings 31 and 32 consists of a flexible screw. In particular, as shown in FIG. 8, the elongated element of the coupling 31 consists of a flexible screw 33 comprising an elongated flexible core 34 about which a helical spring 35 is wound, its turns defining a helical double contact groove 36 for the balls 14.

Figure 9:
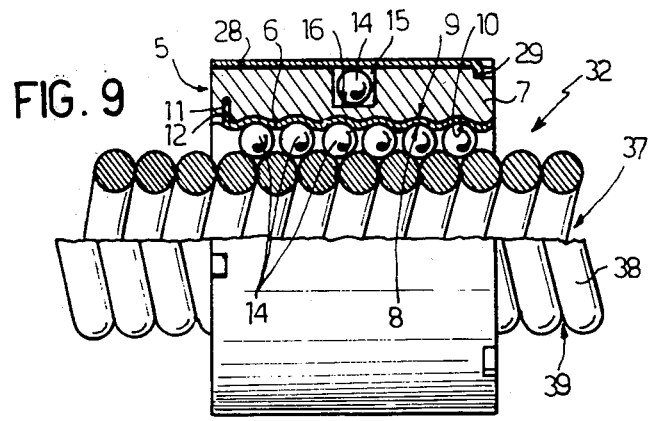
FIG. 9 is a partial axial section through a third screw-nut screw coupling constructed in accordance with the present invention.

In FIG. 9 however, the elongated element of the coupling 32 consists of a flexible screw 37 constructed using a precompressed spring 38, the turns of which define a double contact helical groove 39 for the balls 14.

Instead of being coupled to the tubular element 5, any of the screws 2, 33 and 37 may be coupled to a tubular element 40 shown in FIG. 10, in this case coupled by way of example to the screw 2. The tubular element 40 lacks the outer sleeve 28 and comprises only the sleeves 6 and 7. Furthermore, the sleeve 6 lacks the recirculating channel 16, and the recirculating path is divided into a plurality of recirculating paths 41 (of which only one is shown), each of which embraces only two adjacent turns of the groove 8. For this purpose, a plurality of substantially axial elongated holes or apertures 42 (of which only one is shown) are provided through the sleeve 6, each extending axially to embrace two adjacent turns of the groove 8 and coinciding with the open end of a corresponding radial cavity 43 formed on the inner surface of the sleeve 7. Each of the cavities 43 has a curved bottom surface, along which the balls 14 roll to pass from a point on one turn of the groove 8 to a corresponding point on the previous turn. In order to force the balls 8 to penetrate into the cavity 43, each of these latter is limited frontwards by a deflector element 44 projecting towards the screw 2 in the sleeve 6 and consisting of an appendix formed by the sleeve 7 and projecting from this latter inwards through the respective aperture 42.

As in the case of the channel 16, the cavities 43 may also be constructed during the moulding of the sleeve 7 on the sleeve 6 by using a composite core (not shown) mounted in the sleeve 6 and comprising appendices (not shown) emerging from the apertures 42 thereof.

Evidently, everything that has been stated relative to singlestart screws and nut screws and described with reference to the accompanying drawings is applicable, with obvious modifications, to multi-start screws and nut screws.

What we claim is:

1. A screw-nut screw transmission coupling, comprising an elongate member formed externally with an external helical groove of uniform pitch, a plurality of ball bearings, and a tubular member through which said elongate member extends with radial slack, said tubular member comprising first and second tubular sleeves which are rigidly connected in coaxial arrangement with the first sleeve disposed within the second sleeve, said first sleeve being formed with an internal helical groove of pitch substantially equal to the pitch of said external helical groove, said internal helical groove cooperating with said external helical groove to define a first duct, said second sleeve being formed with a second duct which communicates with said first duct at two points spaced apart therealong by way of at least one hole formed in said first sleeve, said first and second ducts thereby forming an endless rolling duct in which the ball bearings are disposed.

2. A coupling as claimed in claim 1, wherein said first sleeve consists of hardened steel, and said second sleeve is moulded directly on said first sleeve.

3. A coupling as claimed in claim 1, wherein said first sleeve consists of hardened steel, and said second sleeve is obtained by connecting together two premoulded half shells mounted on said first sleeve.

4. A coupling as claimed in claim 1, wherein each said hole formed in said first sleeve is provided with deflector means extending from said inner sleeve towards said elongated element and arranged to cooperate with said ball bearings to compel these latter to follow said endless rolling path.

5. A coupling as claimed in claim 1, wherein said second path extends between two corresponding points to two adjacent turns of said internal helical groove.

6. A coupling as claimed in claim 5, wherein said second path comprises a cavity formed at the inner surface of said second sleeve and having an open end which communicates with the interior of said tubular element by way of a corresponding hole provided through said first sleeve.

7. A coupling as claimed in claim 1, wherein said elongate element consists of a rigid screw.

8. A coupling as claimed in any one of claim 1, wherein said elongate element consists of a flexible screw comprising a central flexible core and a spring wound helically about said central core.

9. A coupling as claimed in claim 1, wherein said elongate element is a flexible screw consisting of a pre-compressed helical spring.

10. A coupling as claimed in claim 1, wherein said first sleeve carries projecting portions engaging said second sleeve and holding said second sleeve against axial and radial movement with respect to said first sleeve.

11. A screw-nut screw transmission coupling comprising a tubular outer member and an elongate inner member having complementary helical grooves cooperating to define a helical ball bearing duct, a return ball bearing duct extending between two spaced points of said helical duct to define herewith an endless ball bearing duct, and a plurality of ball bearings arranged in mutual engagement within said endless duct, said tubular outer member comprising first and second tubular sleeves rigidly connected to one another and arranged with the first sleeve inside the second sleeve; said first tubular sleeve being shaped to define one of said complementary helical grooves; and said return duct extending within said second sleeve and comprising two end portions communicating with said helical duct by way of respective holes formed in said first sleeve, and an intermediate portion forming a filling groove for filling said endless duct with ball bearings; said filling groove being formed on the outer surface of said second sleeve, and cover means being mounted on said second sleeve to retain the ball bearings in said return duct.

12. A coupling as claimed in claim 11, wherein said first sleeve carries projecting portions engaging said second sleeve and holding said second sleeve against axial and radial movement with respect to said first sleeve.

13. A coupling as claimed in claim 11, wherein said cover means comprise a third sleeve mounted on said second sleeve in contact with the outer surface thereof.

14. A coupling as claimed in claim 11, wherein each said hole formed in said first sleeve is provided with deflector means extending from said first sleeve into said helical duct and arranged to cooperate with said ball bearings to compel these latter to follow said endless duct.

15. A coupling as claimed in claim 11, wherein said elongate member consists of a flexible screw comprising a central flexible core and a spring wound helically about said central core.

16. A coupling as claimed in claim 11, wherein said elongate member is a flexible screw consisting of a preloaded helical spring.

17. A screw-nut screw transmission coupling comprising a tubular outer member and an elongate inner member having complementary helical grooves cooperating to define a helical ball bearing duct, a return duct extending between two spaced points of said helical duct to define therewith an endless ball bearing duct, and a plurality of ball bearings arranged in mutual engagement within said endless duct, said tubular outer member comprising an inner tubular sleeve provided internally with one of said helical grooves, an outer tubular sleeve, and an intermediate tubular sleeve rigidly connecting said inner sleeve and said outer sleeve to one another; and said return duct extending within said intermediate sleeve and comprising two end portions communicating with said helical duct by way of respective holes formed in said inner sleeve, and an intermediate portion forming a filling groove for filling said endless duct with ball bearings; said filling groove being formed on the outer surface of said intermediate sleeve, and being laterally closed by said outer sleeve.

18. In combination, a flexible ball lead screw comprising a spring defining an external helical groove, and a ball lead nut comprising an inner tubular sleeve defining an internal helical groove, an outer tubular sleeve, and an intermediate tubular sleeve connecting said inner and outer sleeves with one another; said spring and said inner sleeve co-operating with one another to define therebetween a helical ball bearing duct which communicates at two points spaced apart therealong with a return ball bearing duct formed within said intermediate sleeve and defining, together with said helical duct, an endless duct adapted to have a plurality of ball bearings arranged therein; and said return duct comprising two end portions communicating with said helical duct by way of respective holes formed in said inner sleeve, and an intermediate portion forming a groove formed on the outer surface of said intermediate sleeve and laterally closed by said outer sleeve.

19. A combination as claimed in claim 18, wherein said spring is a preloaded spring.

* * * * *